(12) United States Patent
Woo et al.

(10) Patent No.: US 8,910,612 B2
(45) Date of Patent: Dec. 16, 2014

(54) PRE-CHAMBER JET IGNITER AND ENGINE INCLUDING COMBUSTION CHAMBER EMPLOYING THE SAME

(75) Inventors: Soohyung Woo, Yongin-si (KR);
Kiyoung Kwon, Yongin-si (KR);
Jinkook Kong, Suwon-si (KR);
Youngnam Kim, Hwaseong-si (KR);
Jinsoon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 266 days.

(21) Appl. No.: 13/553,468

(22) Filed: Jul. 19, 2012

(65) Prior Publication Data

US 2013/0220269 A1 Aug. 29, 2013

(30) Foreign Application Priority Data

Feb. 29, 2012 (KR) .................. 10-2012-0021105

(51) Int. Cl.
*F02B 19/00* (2006.01)
*F02B 19/10* (2006.01)
*F02B 19/06* (2006.01)

(52) U.S. Cl.
CPC .............. *F02B 19/10* (2013.01); *F02B 19/06* (2013.01)
USPC ....................... 123/267; 123/288; 123/289

(58) Field of Classification Search
USPC ......... 123/260, 261, 265, 267, 285, 286, 291, 123/293, 288, 289, 275
See application file for complete search history.

(56) References Cited

U.S. PATENT DOCUMENTS

| | | | | | |
|---|---|---|---|---|---|
| 4,210,105 | A | * | 7/1980 | Nohira et al. ................. | 123/277 |
| 4,424,780 | A | * | 1/1984 | Trucco ........................ | 123/255 |
| 5,522,357 | A | * | 6/1996 | Nogi et al. ................... | 123/261 |
| 7,025,036 | B2 | * | 4/2006 | Lampard ....................... | 123/261 |
| 2005/0051130 | A1 | * | 3/2005 | Lampard ....................... | 123/261 |
| 2006/0219210 | A1 | | 10/2006 | Bailey et al. | |
| 2007/0221164 | A1 | * | 9/2007 | Ashida et al. ................ | 123/267 |

FOREIGN PATENT DOCUMENTS

| | | |
|---|---|---|
| JP | 2002-266644 A | 9/2002 |
| JP | 2004-108225 A | 4/2004 |
| JP | 2010-265836 A | 11/2010 |
| KR | 10-2009-0107048 A | 10/2009 |
| KR | 10-2010-0118993 A | 11/2010 |
| WO | WO 2009/109694 A2 | 9/2009 |

* cited by examiner

*Primary Examiner* — Mahmoud Gimie
(74) *Attorney, Agent, or Firm* — Morgan, Lewis & Bockius LLP (57) ABSTRACT

An engine includes a pre-chamber jet igniter which injects at least one jet combustion flame into the combustion chamber from the outside of the combustion chamber in which the piston reciprocates to generate power so that the injected jet combustion flame is utilized as the source of ignition of the fuel injected into the space in the combustion chamber to drive the explosion stroke such that combustion of the combustion chamber can be maintained reliable by the use of jet combustion flames in the form of large flame kernels, fuel consumption can be remarkably improved and the generation of NOx can be remarkably reduced using rapid cold combustion which is caused by the continuously reliable combustion, and, in particular, it is possible to prevent liquefaction of the air-fuel mixture due to variations in the flow and pressure of the air-fuel mixture flowing in the combustion chamber.

18 Claims, 8 Drawing Sheets

PRE-CHAMBER JET IGNITER AND ENGINE INCLUDING COMBUSTION CHAMBER EMPLOYING THE SAME

CROSS-REFERENCE TO RELATED APPLICATIONS

The present application claims priority of Korean Patent Application Number 10-2012-0021105 filed Feb. 29, 2012, the entire contents of which application is incorporated herein for all purposes by this reference.

BACKGROUND OF INVENTION

1. Field of Invention

The present invention relates to an engine, particularly, to an engine including a combustion chamber employing a pre-chamber jet igniter that injects a jet combustion flame, which has been previously formed from an air-fuel mixture, into a space inside the combustion chamber, so that the jet combustion flame serves as a source of ignition of a fuel injected into the space inside the combustion chamber to ignite the fuel, thereby reliably maintaining combustion by use of the jet combustion flame as a large flame kernel and thus remarkably improving fuel consumption and reducing the generation of NOx.

2. Description of Related Art

In general engines, after fuel is directly injected into a combustion chamber (GDI type) or fuel and air are mixed and then supplied to the combustion chamber (MPI type), a combustion flame kernel is created in the combustion chamber by sparks generated from a spark plug, thereby igniting and exploding the air-fuel mixture (flame propagation).

There is a difference between the MPI type and the GDI type in that, in the case in which the fuel is directly injected into the combustion chamber (GDI type), stratified charge combustion is performed, while in the case in which the fuel and the air are mixed and supplied to the combustion chamber (MPI type), homogenous combustion is performed.

Since a explosion stroke is driven by ignition and explosion (flame propagation) in the combustion chamber, power is generated from the engine.

However, if the spark plug generates the ignition sparks in the combustion chamber and the combustion flame kernel is created by the ignition flame in the combustion chamber, the size of the flame kernel is small, and its duration is short, which does not ensure complete combustion in the combustion chamber.

This problem imposes an inherent limit on the above-described combustion schemes.

In order to overcome this limit, lean burn (super lean burn) combustion can be applied to the engine, but the lean burn (super lean burn) combustion has another problem in that a large quantity of NOx is generated due to the high heat of combustion for improving fuel consumption.

In this instance, the generation of NOx can be decreased using DeNOx catalysts, but DeNOx catalysts are expensive, and thus increase costs, and decrease competitiveness.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for engine including a combustion chamber employing a pre-chamber jet igniter that combusts an air-fuel mixture, which is external air and an injected fuel mixed outside of the combustion chamber, and supplies a jet combustion flame of a large flame kernel created by the combustion into the combustion chamber, so that the fuel is ignited and exploded by the jet combustion flame (flame propagation), and the combustion of the combustion chamber is maintained reliable, thereby remarkably improving fuel consumption and reducing the generation of NOx using rapid cold combustion.

Various aspects of the present invention provide for engine including a combustion chamber employing a pre-chamber jet igniter that injects a jet combustion flame in the form of a large flame kernel supplied from outside the combustion chamber into the combustion chamber, so that the jet combustion flame serves as a source of ignition of the fuel injected into the combustion chamber, thereby eliminating air-fuel mixture ports through which air and fuel are supplied, and thus preventing liquefaction of the air-fuel mixture due to variations in the flow and pressure of the air-fuel mixture.

Various aspects of the present invention provide for a pre-chamber jet igniter, wherein air is supplied to a combustion chamber having a reciprocating piston from the atmosphere, a fuel is injected into the inflowing air to form an air-fuel mixture, and then the air-fuel mixture is burnt in the combustion chamber to generate a combustion flame, the combustion flame is injected into a space inside the combustion chamber in the form of at least one jet combustion flame, the jet combustion flame serves as a source of ignition so that the fuel injected into the space inside the combustion chamber is combusted, and a explosion stroke is generated in the combustion chamber by combustion of the injected fuel.

The pre-chamber jet igniter may further include a compression block having a compression chamber in which the external air and the fuel injected into the air are mixed to form the air-fuel mixture, a sub-injector which is installed to the compression block to inject the fuel into the compression chamber, a pressurizing piston which changes the volume of the compression chamber to increase the pressure of the air-fuel mixture, a valve unit which is opened when the pressure of the air-fuel mixture is increased, so that the air-fuel mixture is discharged from the compression chamber, a combustion block having a combustion space to combust the air-fuel mixture discharged from the valve unit, a spark plug which is installed to the combustion block to generate a spark so that the air-fuel mixture passing through the combustion block is combusted, and a jet nozzle which injects a flame generated by combustion of the air-fuel mixture in the form of at least one jet combustion flame, in which the direction of injection of the jet combustion flame is toward the space inside the combustion chamber having the reciprocating piston.

The air-fuel mixture may form a flow passage through which the air-fuel mixture exits through the valve unit, flow in the combustion block, and directly flow in the jet nozzle from the combustion block.

The valve unit and the combustion block may be engaged with the compression block, and the jet nozzle may be engaged with the compression chamber.

The compression block may be provided with a fastening end portion which is engaged with the valve unit and the combustion block, and the fastening end portion may be positioned below the position of the compression chamber.

The pressurizing piston may have a piston that is movable to vary the volume of the compression chamber of the compression block, and a piston rod integrally connected to the piston.

The valve unit may have a sub-check valve for a passage through which the external air flows in the compression chamber from the atmosphere, a main check valve with a passage through which the air-fuel mixture is discharged from the compression chamber, and a fastening end portion inserted into the compression chamber of the compression block.

The combustion block may have an air-fuel mixture passage through which the air-fuel mixture exiting through the main check valve flows, an ignition passage communicating with an end portion of the air-fuel mixture passage so that the spark generated from the spark plug is directed toward the air-fuel mixture passage, a fresh air inflow passage through which fresh air flows from the atmosphere, and a fastening end portion engaged with the compression block and the jet nozzle.

The jet nozzle may have a pre-chamber with a space for combusting the air-fuel mixture supplied to the combustion block, a jet flame injection hole for injecting the combustion flame generated in the pre-chamber towards the space inside the combustion chamber at one or more positions, and a fastening end portion engaged with the air-fuel passage of the combustion passage.

The main check valve may form a one-way passage through which the air-fuel mixture is discharged from the compression chamber, and the flow passage may be opened by the increased pressure of the air-fuel mixture when the pressurizing piston is moved down to contract the volume of the compression chamber.

The sub-check valve may form a one-way passage through which the external air supplied from the atmosphere flows in the compression chamber, and the flow passage may be opened by the decreased pressure of the air-fuel mixture when the pressurizing piston is moved up to expand the volume of the compression chamber.

The main check valve may be installed at a center position of the valve unit, and the sub-check valve may be installed at a position which is away from the center position.

The air-fuel mixture passage and the ignition passage may be arranged in a V-shape in such a way that a communicating portion thereof is located at a top.

The compression block may be provided with a fresh air inflow passage through which the external air flows in the compression chamber from the atmosphere, and a fastening end portion which is engaged with the valve unit and the combustion block, and the fastening end portion may be positioned below the position of the compression chamber. The pressurizing piston may have a piston that is movable to vary the volume of the compression chamber of the compression block, a piston rod that is integrally connected to the piston, a fresh air flow passage that is machined in the piston, and a fuel flow passage that is machined in another portion of the piston to supply the fuel, and communicates with the fresh air flow passage. The valve unit may have a main check valve with a passage through which the air-fuel mixture mixed with the fuel injected into the compression chamber and the external air is discharged from the compression chamber, and a fastening end portion inserted into the compression chamber of the compression block. The combustion block may have an air-fuel mixture passage through which the air-fuel mixture exiting through the main check valve flows, an ignition passage communicating with an end portion of the air-fuel mixture passage so that the spark generated by the spark plug is directed toward the air-fuel mixture passage, and a fastening end portion engaged with the compression block and the jet nozzle. The jet nozzle may have a pre-chamber with a space for combusting the air-fuel mixture supplied to the combustion block, a jet flame injection hole for injecting the combustion flame generated in the pre-chamber towards the space inside the combustion chamber at one or more positions, and a fastening end portion engaged with the air-fuel passage of the combustion passage.

The fresh air inflow passage may be provided with a fresh air valve for supplying the external air to the compression chamber from the atmosphere, and the fresh air valve may be opened when the pressure in the compression chamber is reduced in the process of raising the pressurizing piston to expand the volume of the compression chamber. A mixing valve may be provided at an end portion in which the fresh air flow passage meets the fuel flow passage, and the mixing valve may mix the air passing through the fresh air flow passage and the fuel passing through the fuel flow passage to discharge the air-fuel mixture to the compression chamber.

The fresh air passage and the fuel flow passage may be arranged in a V-shape in such a way that communicating portions thereof are located at a top.

The main check valve may form a one-way passage through which the air-fuel mixture is discharged from the compression chamber, and the flow passage may be opened by the increased pressure of the air-fuel mixture when the pressurizing piston is moved down to contract the volume of the compression chamber.

The jet flame injection hole may be a divergent truncated cone which diverges and expands from the pre-chamber. At least three jet flame injection holes may be provided to form the truncated cone.

Various aspects of the present invention provide for an engine including a combustion chamber employing a pre-chamber jet igniter, includes a jet nozzle which injects at least one jet combustion flame towards a space inside a combustion chamber having a reciprocating piston from the atmosphere, in which the jet combustion flame serves as a source of ignition to combust the fuel injected into the space inside the combustion chamber, and a explosion stroke is carried out in the combustion chamber by the combustion of the injected fuel, an intake valve which opens or closes a passage of an intake manifold at an upper portion of the combustion chamber, an exhaust valve which opens or closes a passage of an exhaust manifold through which exhaust gas generated in the combustion chamber flows, and a main injector which injects the fuel into the space inside the combustion chamber.

The pre-chamber jet igniter may be interposed between the intake valve and the exhaust valve, and the main injector may be positioned at one side of the combustion chamber.

After the external air and the fuel injected into the air are mixed to form the air-fuel mixture and the air-fuel mixture is then combusted outside the combustion chamber of the engine, a jet combustion flame in the form of a large flame kernel may be supplied to the combustion chamber. As a result, it is possible to eliminate air-fuel mixture ports through which air and fuel are supplied, and thus to prevent liquefaction of the air-fuel mixture due to variation in the flow and pressure of the air-fuel mixture.

In addition, after the jet combustion flame in the form of the large flame kernel has been created in advance by the air-fuel mixture, which is external air mixed with a small quantity of fuel outside the combustion chamber, since the jet combustion flame is supplied to the combustion chamber, the combustion in the combustion chamber can be maintained reliable, thereby remarkably improving fuel consumption and reducing the generation of NOx using rapid cold combustion.

Further, since the jet combustion flame is first generated by the air-fuel mixture, which is external air mixed with a small quantity of fuel outside the combustion chamber, and is then supplied to the combustion chamber, it is possible to precisely control combustion (control the air-fuel ratio), and to secure the performance and reliability of the flame ignition in the combustion chamber.

Furthermore, since the shape of the jet combustion flame supplied to the space inside the combustion chamber is first determined accurately from outside the combustion chamber, it is possible to precisely calculate the quantity of fuel that is directly injected into the space inside the combustion chamber, thereby decreasing fuel consumption.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the disclosure, like reference numerals refer to like parts throughout the various figures and embodiments of the present invention.

Figure 1:
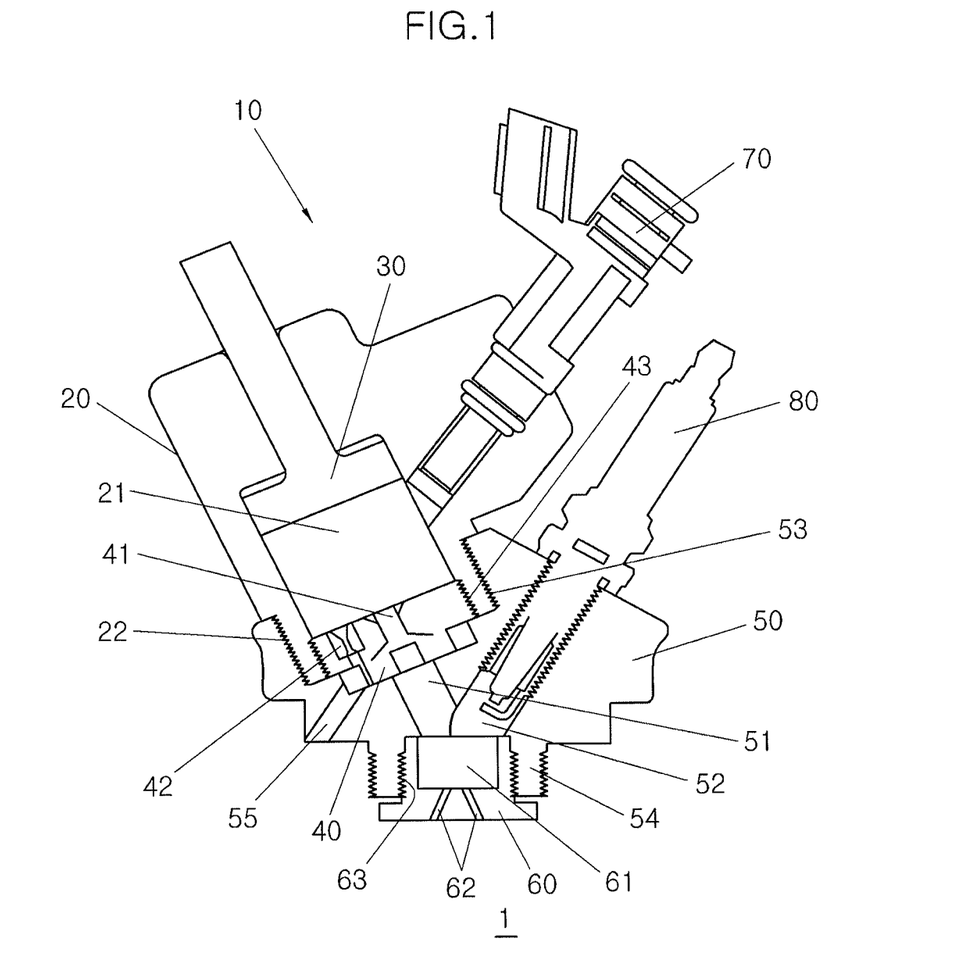
FIG. 1 is a diagram illustrating an exemplary pre-chamber jet igniter according to the present invention.

FIG. 1 illustrates the configuration of a pre-chamber jet igniter according to the present invention.

As shown in the figure, a pre-chamber jet igniter 10 includes a compression block 20 having a compression chamber 21 in which external air flows and a small quantity of fuel is injected, a pressurizing piston 30 for changing the volume of the compression chamber 21 to increase the pressure of the mixture of air and fuel flowing in the compression chamber 21, a valve unit 40, having a flow passage through which air flows in the compression chamber 21 from the atmosphere and a flow passage through which the air-fuel mixture is discharged from the compression chamber 21, a combustion block 50 having a combustion space in which the air-fuel mixture discharged through the valve unit 40 is combusted, and a jet nozzle 60 for injecting the combustion flame of the air-fuel mixture into a space inside the combustion chamber 1 in the form of a jet combustion flame so that the air-fuel mixture serves as a source of ignition of the fuel injected into the space inside the combustion chamber 1.

Also, the pre-chamber jet igniter 10 includes a sub-injector 70 for supplying a small quantity of the fuel into the combustion chamber 1 from the outside, and the sub-injector 70 is installed in the compression block 20 to inject the fuel into the compression chamber 21.

Further, the pre-chamber jet igniter 10 includes a spark plug 80 for generating sparks, and the spark plug 80 is installed in the combustion block 50 to ignite the air-fuel mixture flowing in the combustion block 50.

In the case of the pre-chamber jet igniter 10, if the flow passage of the valve unit 40 is opened as the pressure of the compression chamber 21 is decreased in the process of raising the pressurizing piston 30 to expand the volume of the compression chamber 21, the external air flows in the compression chamber 21 via the opened flow passage of the valve unit 40 from the atmosphere. After the air flows in the compression chamber 21, a small quantity of the fuel is injected into the compression chamber 21 by the sub-injector 70.

Then, if the pressure of the air-fuel mixture is increased in the process of lowering the pressurizing piston 30 to contract the volume of the compression chamber 21, the other flow passage of the valve unit 40 is opened by the pressurizing reaction of the air-fuel mixture, so that the air-fuel mixture is discharged into the combustion space in the combustion block 50 via the valve unit 40.

As described above, the air-fuel mixture flows in the combustion block 50, and then the spark plug 80 generates the sparks to ignite the air-fuel mixture. The combustion flame generated by the combustion of the air-fuel mixture is injected in the shape of at least one jet combustion flame toward the space inside the combustion chamber 1 through the jet nozzle 60.

The jet combustion flame servers as a source of ignition to combust the fuel injected into the space inside the combustion chamber 1, and a explosion stroke is driven in the combustion chamber with the combustion of the injected fuel.

The process of operating the pre-chamber jet igniter 10 may be suitably modified, as necessary.

The control is achieved by a controller for wholly controlling the pre-chamber jet igniter 10. The controller may be a separate controller, but a common ECU (Engine Control Unit) may be utilized.

The valve unit 40 is engaged with the compression block 20 to block the opening in the compression chamber 21, and the combustion block 50 is engaged with the compression block 20 to cover the valve unit 40.

For the above purpose, the compression block 20 is further provided with a fastening end portion 22, and an internal threaded portion formed in the inner surface of the fastening end portion 22 is fastened to an external threaded portion formed in the outer surface of the valve unit 40. An external threaded portion formed in the outer surface of the fastening end portion 22 is fastened to an internal threaded portion formed in the inner surface of the combustion block 50.

Alternatively, the above-described threaded fastening may be replaced by interference fitting or ribbed fitting.

The pressurizing piston 30 has a piston that is movable in the space inside the compression chamber 21 to vary the volume of the compression chamber 21 in the compression block 20, and a piston rod integrally connected to the piston and exposed outwardly from the compression block.

In general, the pressurizing piston 30 is reciprocally moved up and down by a separate operation mechanism. The piston rod is connected to the operation mechanism.

The operation mechanism is controlled by the controller for controlling the overall operation of the pre-chamber jet igniter 10. The controller may be a separate controller, but a common ECU (Engine Control Unit) may be utilized.

The valve unit 40 has a main check valve 41 with the flow passage through which the air-fuel mixture is discharged outwardly from the compression chamber 21, and a sub-check valve 42 with another flow passage through which the air flows in the compression chamber 21 from the atmosphere.

The flow passage in the main check valve 41 is a one-way passage through which the air-fuel mixture is discharged from the compression chamber 21, and the one-way passage is formed in reaction to the increased pressure of the air-fuel mixture when the pressurizing piston is moved down to contract the volume of the compression chamber 21.

Meanwhile, the flow passage in the sub-check valve 42 is a one-way passage through which the air flows in the compression chamber 21 from the atmosphere, and the one-way passage is formed in reaction to the decreased pressure of the air-fuel mixture when the pressurizing piston is moved up to expand the volume of the compression chamber 21.

Therefore, the external air can flow in the compression chamber 21 through the sub-check valve 42 under atmospheric pressure.

In general, the main check valve 41 is installed at a center position of the valve unit 40, while the sub-check valve 42 is installed at a position near the edge of the valve unit 40, that is, away from the center position.

In addition, the valve unit 40 is further provided with a fastening end portion 43 having an external threaded portion in the outer surface thereof. The fastening end portion 43 is fastened to the internal threaded portion formed in the inner surface of the fastening end portion 22 below the compression chamber 21 of the compression block 20.

Alternatively, the above-described threaded fastening may be replaced by interference fitting or ribbed fitting.

The combustion block 50 has an air-fuel mixture passage 51 through which the air-fuel mixture exiting through the valve unit 40 flows, an ignition passage 52 communicating with an end portion of the air-fuel mixture passage 51 so that the sparks generated from the spark plug 80 are directed toward the air-fuel mixture passage 51, and a fresh air inflow passage 55 through which fresh air flows in the compression chamber 21 through the sub-check valve 42 from the atmosphere.

The air-fuel mixture passage 51 and the ignition passage 52 are substantially arranged in a V-shaped arrangement, but may be arranged perpendicular to each other, if necessary.

In addition, the combustion block 50 is provided with two fastening end portions 53 and 54 at different positions.

Of the two fastening end portions 53 and 54, an internal threaded portion formed in the inner surface of the fastening end portion 53 is fastened to an external threaded portion formed in the outer surface of the compression chamber 21, while an internal threaded portion formed in the inner surface of the other fastening end portion 54 is fastened to an external threaded portion formed in the outer surface of the jet nozzle 60 which is inserted from the end portion of the air-fuel mixture passage 51.

Alternatively, the above-described threaded fastening may be replaced by interference fitting or ribbed fitting.

The jet nozzle 60 has a pre-chamber 61 with a space into which the combustion flame of the air-fuel mixture ignited by the sparks of the spark plug is transferred, and a jet flame injection hole 62 for injecting the combustion flame generated in the pre-chamber 61 towards the space inside the combustion chamber 1 in the form of at least one jet combustion flame.

The jet flame injection hole 62 is a divergent truncated cone that diverges expands from the pre-chamber 61, and has a given diameter to form the truncated cone. A plurality of jet flame injection hole 62 are provided.

Three jet flame injection holes 62 are formed, but the number of jet flame injection holes 62 can be increased or decreased in consideration of the injection performance of the combustion flame.

In addition, the jet nozzle 60 is further provided with a fastening end portion 63 having an external threaded portion in the outer surface thereof. The fastening end portion 63 is fastened to the internal threaded portion formed in the inner surface of the fastening end portion 54 in the combustion block 50.

Alternatively, the above-described threaded fastening may be replaced by interference fitting or ribbed fitting.

The sub-injector 70 is a common injector for injecting the fuel, and is installed on a side portion of the compression chamber 21 of the compression block 20.

The fuel injected from the sub-injector 70 is directly injected into the compression chamber 21.

The spark plug 80 is a common spark plug for generating sparks.

Figure 2:
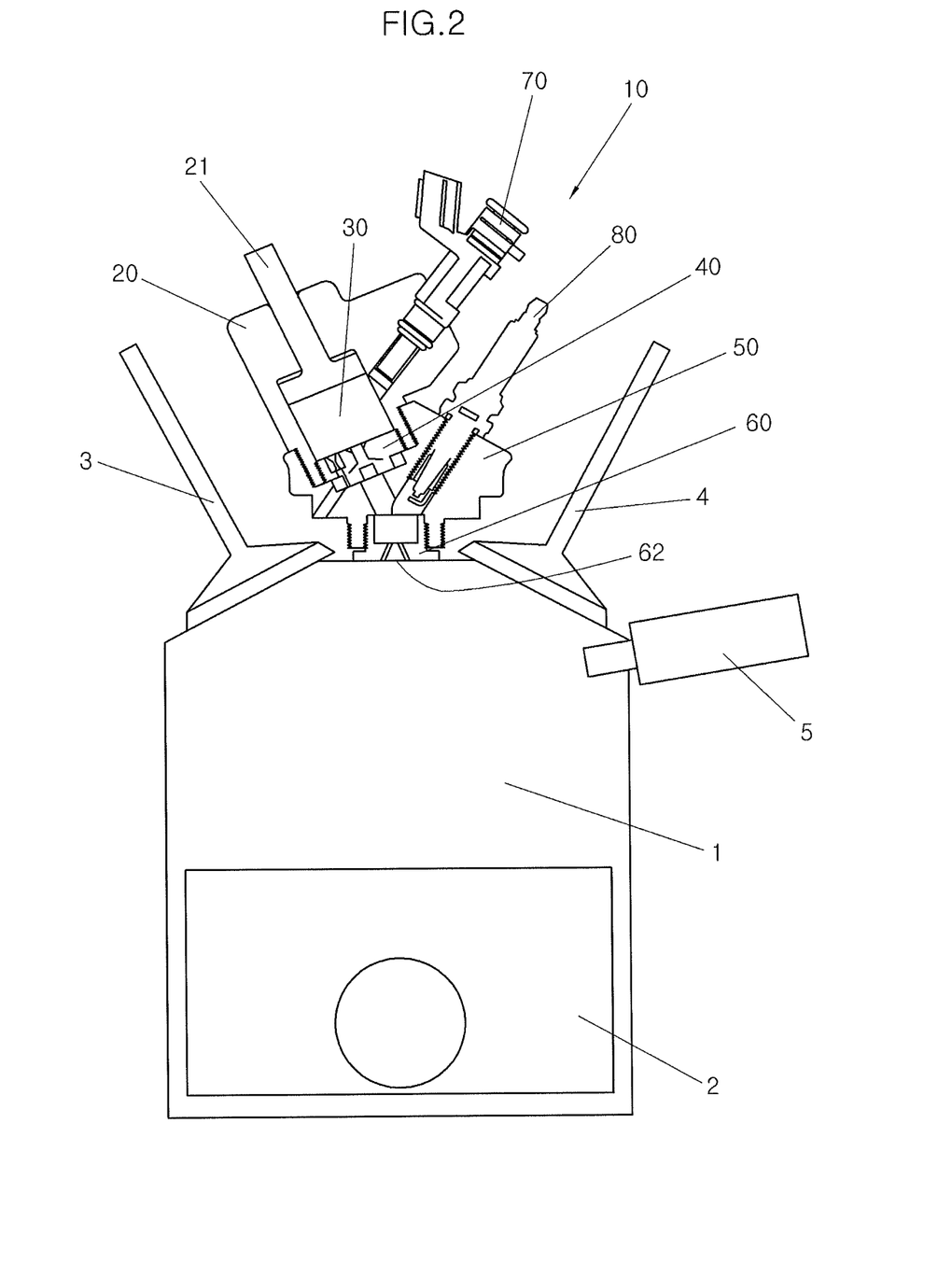
FIG. 2 is a diagram illustrating an exemplary engine having a combustion chamber to which a pre-chamber jet igniter is provided according to the present invention.

FIG. 2 illustrates the configuration of the engine having the combustion chamber to which the pre-chamber jet igniter according to the present invention is applied.

As shown in the figure, the engine includes a combustion chamber 1 with a piston 2 that reciprocates to generate engine power, and the pre-chamber jet igniter 10 for injecting the jet combustion flame towards the combustion chamber 1.

The engine is provided with common engine components, and, specifically, includes, for example, an intake valve 3 for opening or closing a passage of an intake manifold through which air passing through an air filter flows, an exhaust valve 4 positioned a given interval away from the intake vale 3 and opening or closing a passage of an exhaust manifold through which exhaust gas generated at the time of combustion flows, and a main injector 5 installed at a side of the combustion chamber 1 to inject fuel into the space inside the combustion chamber 1.

In this instance, the pre-chamber jet igniter 10 is interposed between the intake valve 3 and the exhaust valve 4.

However, the pre-chamber jet igniter 10 is not limited to a position at which the jet combustion flame exiting through the pre-chamber jet igniter 10 can be injected into the combustion chamber 1, and the main injector 5 is not limited to a position at which the injected fuel can be injected into the combustion chamber 1, in consideration of the shape of the combustion chamber 1 or the structure of the engine.

Figure 3:
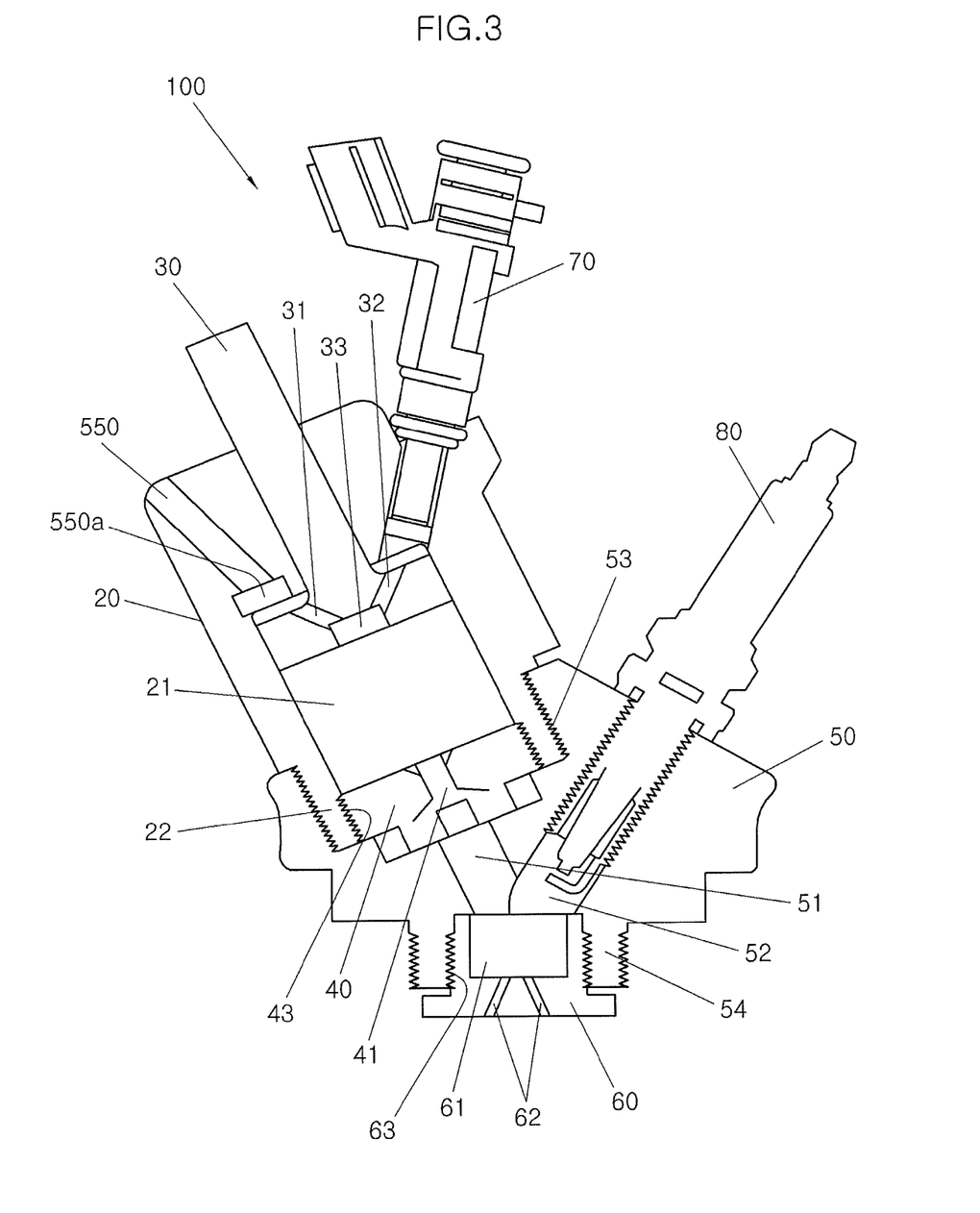
FIG. 3 is a diagram illustrating an exemplary pre-chamber jet igniter according to the present invention.

FIG. 3 illustrates the configuration of a pre-chamber jet igniter according to various embodiments of the present invention.

As shown in the figure, a pre-chamber jet igniter 100 includes a compression block 20 having a compression chamber 21 in which external air and a small quantity of fuel are mixed to create an air-fuel mixture, a pressurizing piston 30 for changing the volume of the compression chamber 21, a valve unit 40 for supplying the external air into the compression chamber 21 and discharging the air-fuel mixture from the compression chamber 21, a combustion block 50 with a combustion space in which the air-fuel mixture discharged through the valve unit 40 is combusted, a jet nozzle 60 for injecting the combustion flame of the air-fuel mixture into a space inside the combustion chamber 1 in the form of a jet combustion flame so that the air-fuel mixture serves as a source of ignition of the fuel injected into a space inside the combustion chamber 1, and a spark plug 80 for generating sparks to ignite the compressed air.

The pre-chamber jet igniter 100 includes the same constructional elements as those of the above-described pre-chamber jet igniter 10 shown in FIGS. 1 and 2.

In order to supply the external air into the space inside the compression chamber 21 from the atmosphere, the pre-chamber jet igniter 100 is provided with an air flow passage, through which the external air flows in the compression block 20 and then flows in the space inside the compression chamber 21 via the pressurizing piston 30.

In addition, in order to supply the fuel injected from the sub-injector 70 to the space inside the compression chamber 21, the pre-chamber jet igniter 100 is provided with a fuel flow passage, through which the fuel flows in the space inside the compression chamber 21 via the pressurizing piston 30.

The difference between the pre-chamber jet igniter 100 and the pre-chamber jet igniter 10 shown in FIGS. 1 and 2 is the passage for supplying the external air and the fuel.

Therefore, the compression block 20 configuring the pre-chamber jet igniter 100 is further provided with a fresh air inflow passage 550 that communicates with the compression chamber 21. The external air flows in the compression chamber 21 through the fresh air inflow passage 550 from the atmosphere.

The fresh air inflow passage 550 is provided with a fresh air valve 550a, so that the compression chamber formed in the process of raising the pressurizing piston 30 to expand the volume of the compression chamber 21 is opened.

The fresh air valve 550a is a check valve allowing air to flow in one direction.

In addition, the pressurizing piston 30 is provided with a fresh air flow passage 31 through which the external air passing through the fresh air inflow passage 550 flows, and a fuel flow passage 32 through which the fuel injected from the sub-injector 70 flows.

Also, the pre-chamber jet igniter 100 includes a mixing valve 33 at a position in which the fresh air flow passage 31 meets the fuel flow passage 32. The mixing valve 33 mixes the air passing through the fresh air flow passage 31 and the fuel passing through the fuel flow passage 32 to discharge the air-fuel mixture to the compression chamber 21.

The mixing valve 33 is a check valve allowing the air-fuel mixture to flow in one way.

As described above, since the air flow passage for the external air is formed, the valve unit 40 can have the main check valve 41 only, without using the sub-check valve 42. In addition, the combustion block 50 is not provided with the fresh air inflow passage 55 communicating with the sub-check valve 42.

Figure 4:
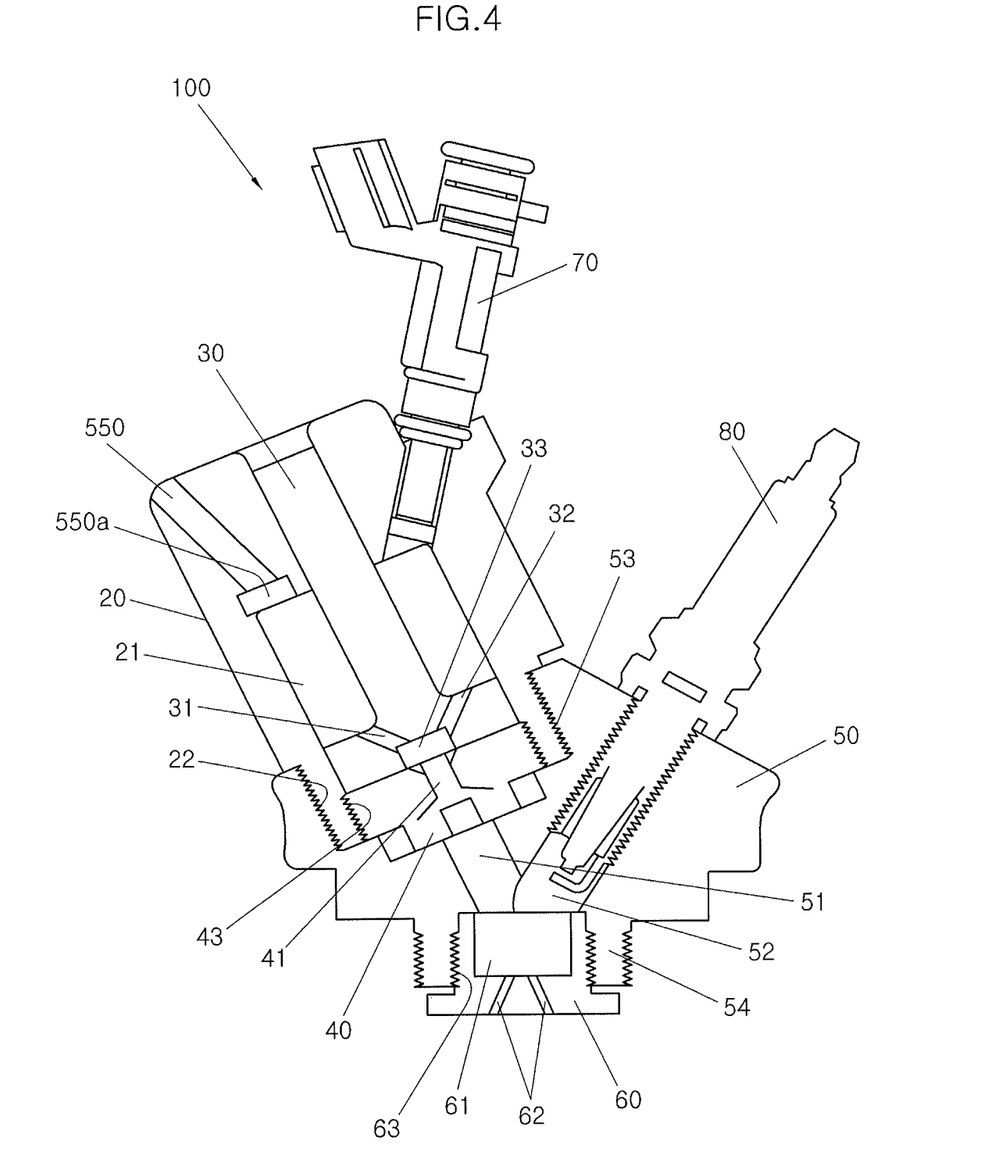
FIG. 4 is a diagram illustrating the state of operation of the pre-chamber jet igniter shown in FIG. 3.

FIG. 4 illustrates the state of operation of the pre-chamber jet igniter 100 shown in FIG. 3.

As shown in the figure, when the pre-chamber jet igniter 100 operates, the external air flows in the fresh air inflow passage 550 of the compression block 20 from the atmosphere, and then the air entering the fresh air inflow passage flows in the fresh air flow passage 31 of the pressurizing piston 30 via the fresh air valve 550a.

The external air entering the fresh air flow passage 31 temporarily stays in the fresh air flow passage 31 which is blocked by the mixing valve 33. At that time, a small quantity of the fuel injected from the sub-injector 70 flows in the fresh air flow passage 31 via the fuel flow passage 32.

Therefore, the fuel and the external air are mixed in the fresh air flow passage 31 to form the air-fuel mixture, and then the air-fuel mixture is discharged to the compression chamber 21 through the opened passage of the mixing valve 33.

Next, the pressurizing piston 30 is lowered to contract the volume of the compression chamber 2, and thus the pressure of the air-fuel mixture is increased. The passage of the main check valve 41 of the valve unit 40 is opened by the pressurized reaction of the air-fuel mixture, and thus the air-fuel mixture flows in the combustion block 50.

The air-fuel mixture entering the combustion block 50 is ignited by the sparks generated from the spark plug 80, and then the combusting air-fuel mixture is supplied to the jet nozzle 60. Since the jet combustion flame is injected from the jet nozzle 60 into the combustion chamber 1, the fuel previously injected into the space inside the combustion chamber 1. The operation will be described in detail hereinafter.

Figure 5:
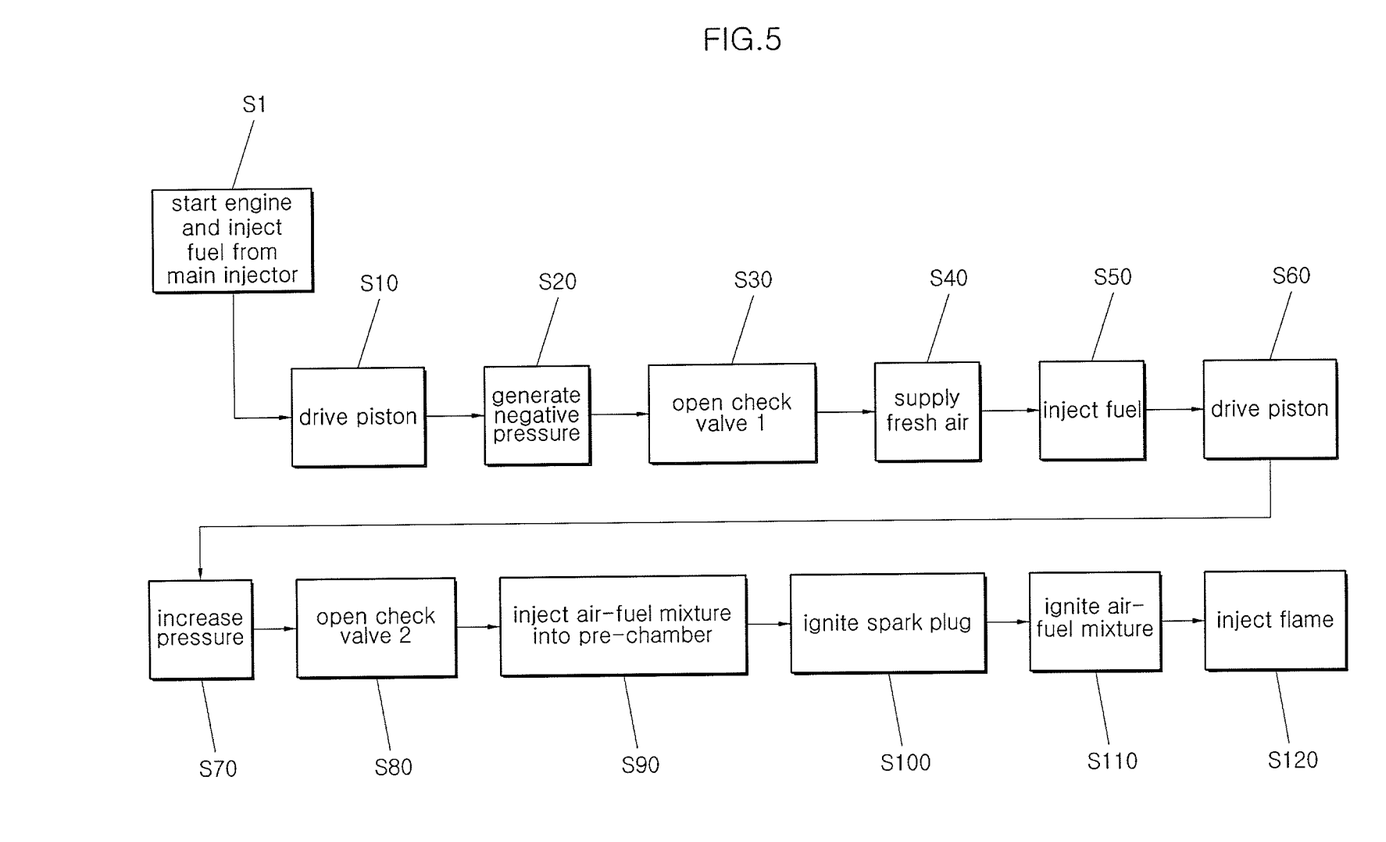
FIG. 5 is a flowchart showing the operation of an exemplary pre-chamber jet igniter according to the present invention.
Figure 6:
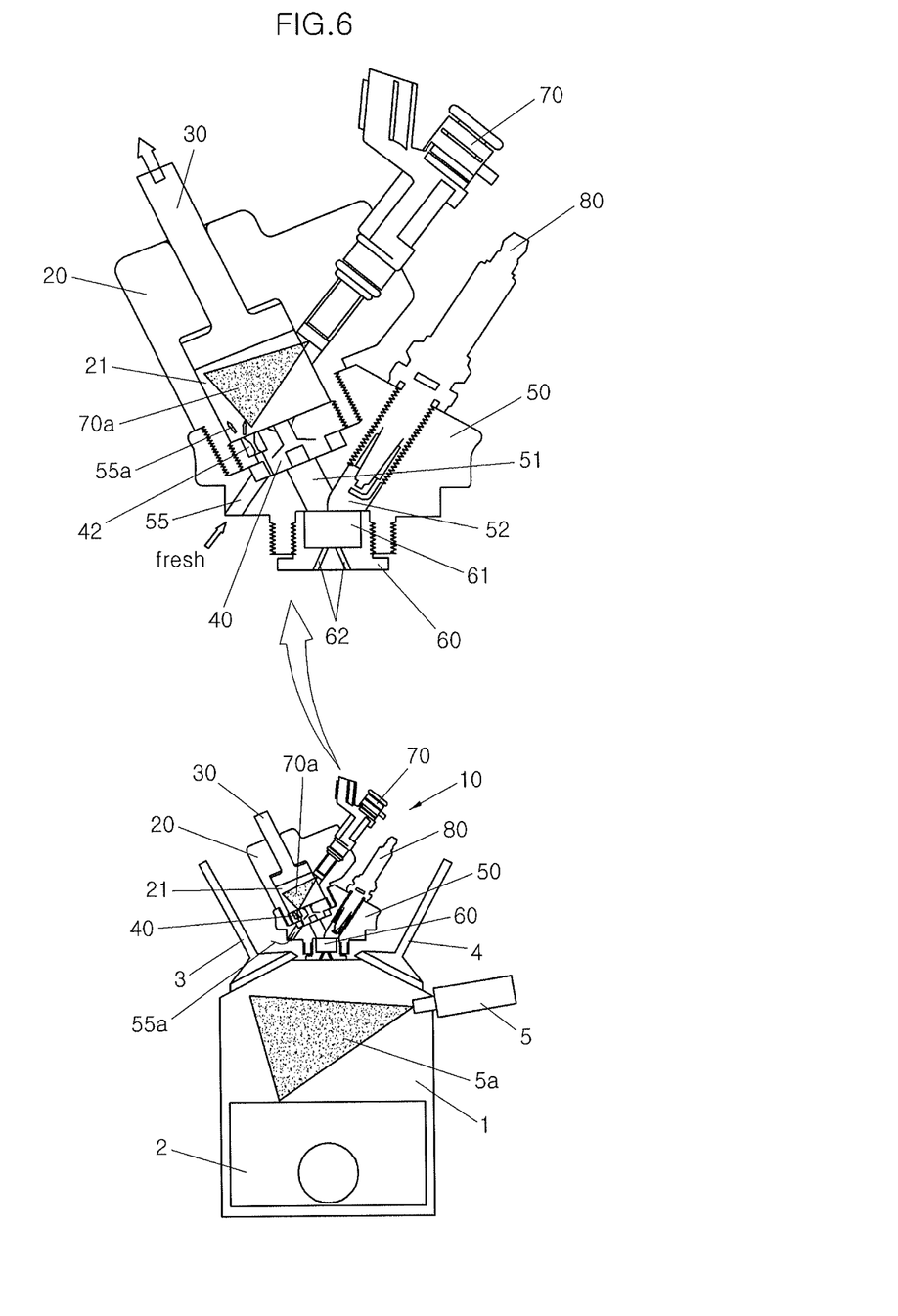
FIGS. 6 and 7 are diagrams illustrating the state of operation of the pre-chamber jet igniter shown in FIG. 5.
Figure 7:
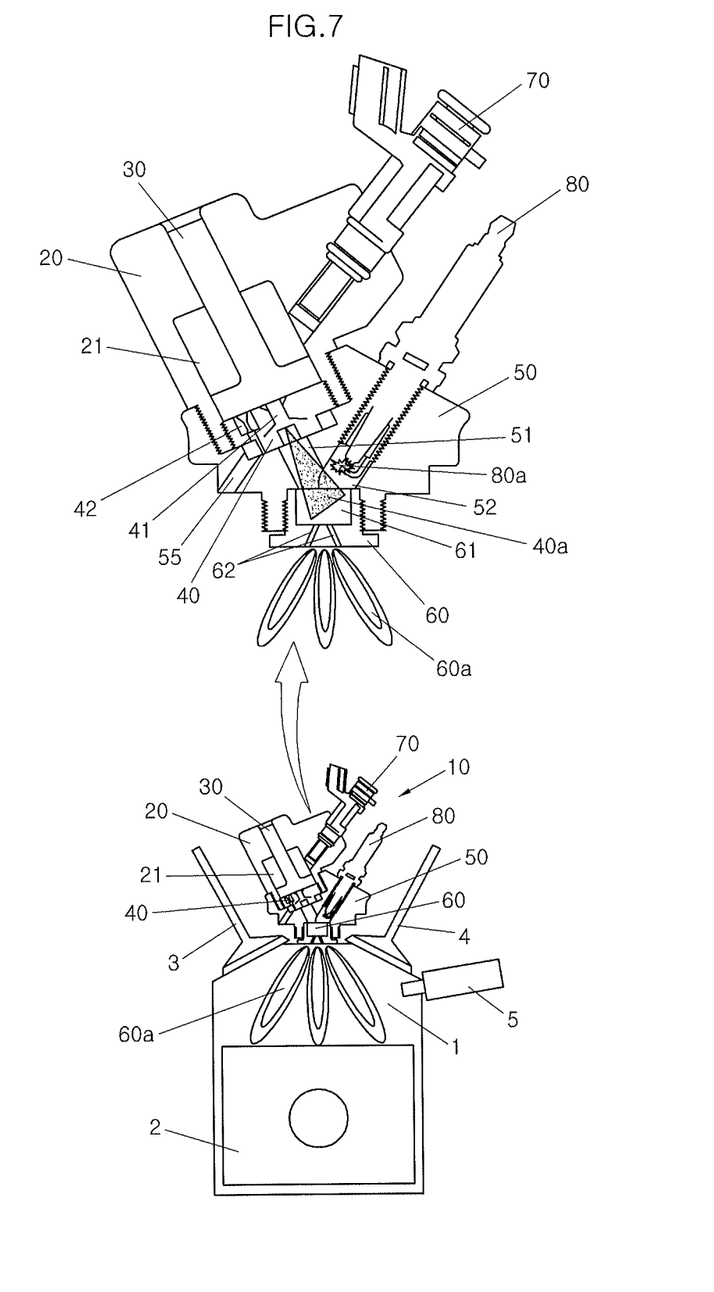
Figure 8:
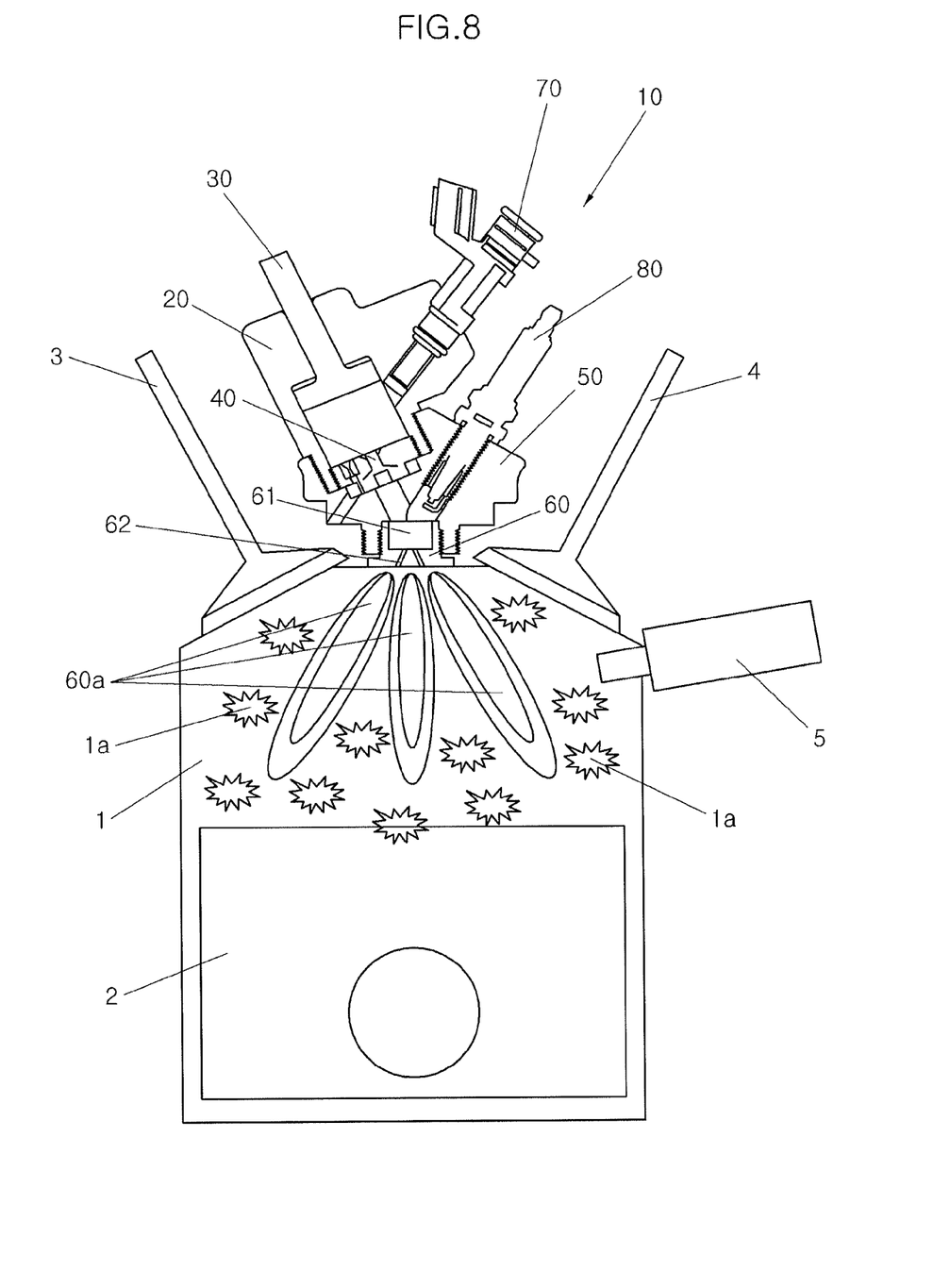
FIG. 8 is a diagram illustrating the state of combustion of an exemplary combustion chamber in which a jet combustion flame is injected by the operation of a pre-chamber jet igniter according to the present invention.

FIG. 5 illustrates the process of operating the pre-chamber jet igniter according to various embodiments, and the operation of the pre-chamber jet igniter 10 and each state of the engine combustion chamber 1 are shown in FIGS. 6 to 8.

In particular, such this process is identical to the case of the pre-chamber jet igniter 10 or the pre-chamber jet igniter 100 having the modified configuration of the pre-chamber jet igniter 10.

With reference to FIG. 5, when the engine is operated at step S1, the fuel is injected from the main injector 5 into the combustion chamber 1, and then the pre-chamber jet igniter 10 is converted into the operating state.

When the pre-chamber jet igniter 10 is operated, the pressurizing piston 30 is moved up to expand the volume of the compression chamber 21 at step S10, and thus the pressure is decreased in the compression chamber 21 at step S20.

The movement of the pressurizing piston 30 occurs in the state in which the pressurizing piston 30 is positioned at a lower end portion of the compression chamber 21. If the pressurizing piston 30 is positioned at an upper end portion of the compression chamber 21, the pressurizing piston 30 does not move up.

The sub-check valve 42 of the valve unit 40 is opened by the decreased pressure of the compression chamber 21 at step S30, and the external air entering the fresh air inflow passage 55 of the combustion block 50 flows in the compression chamber 21 via the passage of the sub-check valve 42 at step S40.

After the external air flows into the compression chamber 21 from the atmosphere, the sub-injector 70 injects a small quantity of the fuel into the compression chamber 21 at step S50, so that the external air and the injected fuel are mixed in the space inside the compression chamber 21 to form the air-fuel mixture.

In this instance, in FIG. 6 the external air is indicated by reference numeral 55a, and the injected fuel is indicated by reference numeral 70a. It can be seen from FIG. 6 that the external air 55a flows in the combustion chamber 21 through the fresh air inflow passage 55 and the opened passage of the sub-check valve 42. In addition, in the flow of the injected fuel 70a, it can be seen that the fuel 70a is directly injected from the sub-injector 70, and is then supplied to the compression chamber 21 to which the external air 55a is supplied.

After the fuel is injected from the sub-injector 70, the pressurizing piston 30 is moved down in the compression chamber 21 at step S60 in FIG. 5, and thus the volume of the compression chamber 21 is relatively decreased.

The decreased volume of the compression chamber 21 causes the pressure of the air-fuel mixture existing in the space inside the compression chamber 21 to increase at step S70.

If the pressure of the air-fuel mixture is increased, the passage of the main check valve 41 of the valve unit 40 is opened at step S80, but the sub-check valve 42, which opens in the direction opposite that of the main check valve 41, is not influenced.

If the passage of the main check valve 41 is opened, the air-fuel mixture comes out from the passage of the main check valve 41, and is then injected into the air-fuel mixture passage 51 of the combustion block 50 at step S90.

If the air-fuel mixture flows in the air-fuel mixture passage 51, the spark plug 80 generates sparks to ignite the air-fuel mixture at step S100.

In FIG. 7, the air-fuel mixture passing through the passage of the main check valve 41 is referred to as the injected air-fuel mixture 40a. It can be seen that the injected air-fuel mixture 40a is ignited by the sparks 80a generated from the spark plug 80 while passing through the air-fuel mixture passage 51.

The combustion of the air-fuel mixture is transferred to the space in the pre-chamber 61 of the jet nozzle 60 at step S110 to form the combustion flame. The combustion flame is injected into the jet flame injection hole 62 communicating with the pre-chamber 61 at step S120.

In this instance, in FIG. 8 the jet combustion flame injected into the jet flame injection hole 62 is indicated by the jet combustion flame 60a. FIG. 8 shows the combustion state in which the fuel is combusted by the jet combustion flame 60a in the space inside the combustion chamber 1.

As shown in the figure, the jet combustion flames 60a are dispersed in a conical shape in the space inside the combustion chamber 1. The jet combustion flames 60a serve as a source of ignition to combust the fuel which was injected in advance into the space inside the combustion chamber 1.

Therefore, the fuel combustion flames 1 a can be generated evenly and simultaneously in all of the space inside the combustion chamber 1.

As described above, the engine according to various embodiments includes the pre-chamber jet igniter 10 or 100 that injects at least one jet combustion flame 60a into the combustion chamber 1 outside the combustion chamber 1 in which the piston 2 reciprocates to generate the power so that the injected jet combustion flame 60a is utilized as the source of ignition of the fuel injected into the space in the combustion chamber 1 to drive the power stroke. As a result, the combustion of the combustion chamber 1 can be maintained reliable by use of the jet combustion flames 60 in the form of large flame kernels, and fuel consumption can be remarkably improved and the generation of NOx can be remarkably reduced using rapid cold combustion which is caused by the continuously reliable combustion. In particular, since air-fuel mixture ports through which the external air and the fuel flow can be eliminated, it is possible to prevent liquefaction of the air-fuel mixture due to variations in the flow and pressure of the air-fuel mixture flowing in the combustion chamber 1.

For convenience in explanation and accurate definition in the appended claims, the terms upper or lower, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pre-chamber jet igniter, wherein
air is supplied to a combustion chamber having a reciprocating piston;
fuel is injected into the air to form an air-fuel mixture, and the air-fuel mixture is then burnt in the combustion chamber to generate a combustion flame;
the combustion flame is injected into a space inside the combustion chamber in a form of at least one jet combustion flame;
the jet combustion flame serves as a source of ignition so that the fuel injected into the space inside the combustion chamber is combusted; and
a explosion stroke is driven in the combustion chamber by combustion of the injected fuel, the pre-chamber jet igniter comprising:
a compression block having a compression chamber in which the external air and the fuel injected into the air are mixed to form the air-fuel mixture;
a sub-injector which is installed to the compression block to inject the fuel into the compression chamber;
a pressurizing piston which changes a volume of the compression chamber to increase a pressure of the air-fuel mixture;
a valve unit which is opened when the pressure of the air-fuel mixture is increased, so that the air-fuel mixture is discharged from the compression chamber;
a combustion block having a combustion space to combust the air-fuel mixture discharged from the valve unit;
a spark plug which is installed in the combustion block to generate a spark so that the air-fuel mixture passing through the combustion block is combusted; and
a jet nozzle which injects a flame generated by combustion of the air-fuel mixture in a form of at least one jet combustion flame, in which an injection direction of the jet combustion flame is toward the space inside the combustion chamber having the reciprocating piston.

2. The pre-chamber jet igniter of claim 1, wherein the air-fuel mixture forms a flow passage through which the air-fuel mixture exits through the valve unit, then flows in the combustion block, and directly flows in the jet nozzle from the combustion block.

3. The pre-chamber jet igniter of claim 2, wherein the valve unit and the combustion block are engaged with the compression block, and the jet nozzle is engaged with the combustion block.

4. The pre-chamber jet igniter of claim 1, wherein the compression block is provided with a fastening end portion which is engaged with the valve unit and the combustion block, and the fastening end portion is positioned below a position of the compression chamber;
the pressurizing piston has a piston being movable to vary the volume of the compression chamber of the compression block, and a piston rod integrally connected to the piston;
the valve unit has a sub-check valve for a passage through which the external air flows in the compression chamber from the atmosphere, a main check valve with a passage through which the air-fuel mixture is discharged from the compression chamber, and a fastening end portion inserted into the compression chamber of the compression block;

the combustion block has an air-fuel mixture passage through which the air-fuel mixture exiting through the main check valve flows, an ignition passage communicating with an end portion of the air-fuel mixture passage so that the spark generated from the spark plug is directed toward the air-fuel mixture passage, a fresh air inflow passage through which fresh air flows from the atmosphere, and a fastening end portion engaged with the compression block and the jet nozzle; and the jet nozzle has a pre-chamber with a space for combusting the air-fuel mixture supplied to the combustion block, a jet flame injection hole for injecting the combustion flame generated in the pre-chamber towards the space inside the combustion chamber at one or more positions, and a fastening end portion engaged with the air-fuel passage of the combustion passage.

5. The pre-chamber jet igniter of claim 4, wherein the main check valve forms a one-way passage through which the air-fuel mixture is discharged from the compression chamber, and the flow passage is opened by increased pressure of the air-fuel mixture when the pressurizing piston is moved down to contract the volume of the compression chamber; and the sub-check valve forms a one-way passage through which the external air supplied from the atmosphere flows in the compression chamber, and the flow passage is opened by decreased pressure of the air-fuel mixture when the pressurizing piston is moved up to expand the volume of the compression chamber.

6. The pre-chamber jet igniter of claim 5, wherein the main check valve is installed at a center position of the valve unit, and the sub-check valve is installed at a position which is away from the center position.

7. The pre-chamber jet igniter of claim 4, wherein the air-fuel mixture passage and the ignition passage are arranged in a V-shape in such a way that a communicating portion thereof is located at a top.

8. The pre-chamber jet igniter of claim 1, wherein the compression block is provided with a fresh air inflow passage through which the external air flows in the compression chamber from the atmosphere, and a fastening end portion which is engaged with the valve unit and the combustion block, and the fastening end portion is positioned below a position of the compression chamber;

the pressurizing piston has a piston that is movable to vary the volume of the compression chamber of the compression block, a piston rod integrally connected to the piston, a fresh air flow passage machined in the piston, and a fuel flow passage machined in another portion of the piston to supply the fuel, and communicating with the fresh air flow passage;

the valve unit has a main check valve with a passage through which the air-fuel mixture, which is the fuel injected into the compression chamber mixed with the external air, is discharged from the compression chamber, and a fastening end portion inserted into the compression chamber of the compression block;

the combustion block has an air-fuel mixture passage through which the air-fuel mixture exiting through the main check valve flows, an ignition passage communicating with an end portion of the air-fuel mixture passage so that the spark generated from the spark plug is directed toward the air-fuel mixture passage, and a fastening end portion engaged with the compression block and the jet nozzle; and the jet nozzle has a pre-chamber with a space for combusting the air-fuel mixture supplied to the combustion block, a jet flame injection hole for injecting the combustion flame generated in the pre-chamber towards the space inside the combustion chamber at one or more positions, and a fastening end portion engaged with the air-fuel passage of the combustion passage.

9. The pre-chamber jet igniter of claim 8, wherein the fresh air inflow passage is provided with a fresh air valve for supplying the external air to the compression chamber from the atmosphere, and the fresh air valve is opened when the pressure of the compression chamber is reduced in a process of raising the pressurizing piston to expand the volume of the compression chamber; and a mixing valve is provided at an end portion in which the fresh air flow passage meets the fuel flow passage, and the mixing valve mixes air passing through the fresh air flow passage and the fuel passing through the fuel flow passage to discharge the air-fuel mixture to the compression chamber.

10. The pre-chamber jet igniter of claim 8, wherein the fresh air passage and the fuel flow passage are arranged in a V-shape in such a way that a communicating portion thereof is located at a top.

11. The pre-chamber jet igniter of claim 8, wherein the main check valve forms a one-way passage through which the air-fuel mixture is discharged from the compression chamber, and the flow passage is opened by increased pressure of the air-fuel mixture when the pressurizing piston is moved down to contract the volume of the compression chamber.

12. The pre-chamber jet igniter of claim 8, wherein the main check valve is installed at a center position of the valve unit.

13. The pre-chamber jet igniter of claim 4, wherein the jet flame injection hole is a divergent truncated cone which diverges and expands from the pre-chamber.

14. The pre-chamber jet igniter of claim 8, wherein the jet flame injection hole is a divergent truncated cone which diverges and expands from the pre-chamber.

15. The pre-chamber jet igniter of claim 13, wherein at least three jet flame injection holes are provided to form the truncated cone.

16. An engine including a combustion chamber employing a pre-chamber jet igniter, comprising:

a jet nozzle which injects at least one jet combustion flame from an atmosphere towards a space inside a combustion chamber having a reciprocating piston, in which the jet combustion flame serves as a source of ignition to combust fuel injected into the space inside the combustion chamber, and a explosion stroke is driven in the combustion chamber by combustion of the injected fuel;

an intake valve which opens or closes a passage of an intake manifold at an upper portion of the combustion chamber;

an exhaust valve which opens or closes a passage of an exhaust manifold through which exhaust gas generated in the combustion chamber flows; and a main injector which injects the fuel into the space inside the combustion chamber, wherein the pre-chamber jet igniter includes a compression block having a compression chamber in which external air supplied from an atmosphere and fuel injected into the air are mixed to create an air-fuel mixture;

a sub-injector which is installed to the compression block to inject the fuel into the compression chamber;
a pressurizing piston which varies a volume of the compression chamber to increase a pressure of the air-fuel mixture;
a valve unit which is opened when the pressure of the air-fuel mixture is increased, so that the air-fuel mixture is discharged from the compression chamber;
a combustion block with a combustion space in which the air-fuel mixture discharged through the valve unit is combusted;
a spark plug which is installed to the combustion block and generates a spark to ignite the air-fuel mixture passing through the combustion block; and
a jet nozzle which injects a combustion flame of the air-fuel mixture in a form of at least one jet combustion flame, and has a piston reciprocating in an injection direction of the jet combustion flame.

17. The engine of claim 16, wherein the pre-chamber jet igniter is interposed between the intake valve and the exhaust valve, and the main injector is positioned at a side of the combustion chamber.

18. The engine of claim 17, wherein the pre-chamber jet igniter includes a compression block having a compression chamber in which external air supplied from an atmosphere and fuel injected into the air are mixed to create an air-fuel mixture;
a sub-injector which is installed to the compression block to inject the fuel into the compression chamber;
a pressurizing piston which varies a volume of the compression chamber to increase a pressure of the air-fuel mixture;
a valve unit which is opened when the pressure of the air-fuel mixture is increased, so that the air-fuel mixture is discharged from the compression chamber;
a combustion block with a combustion space in which the air-fuel mixture discharged through the valve unit is combusted;
a spark plug which is installed to the combustion block and generates a spark to ignite the air-fuel mixture passing through the combustion block; and
a jet nozzle which injects a combustion flame of the air-fuel mixture in a form of at least one jet combustion flame, and has a piston reciprocating in an injection direction of the jet combustion flame.

* * * * *